(12) United States Patent
Gong et al.

(10) Patent No.: US 11,794,693 B2
(45) Date of Patent: Oct. 24, 2023

(54) WIRELESS CHARGING DEVICE AND WARNING SIGNAL GENERATING METHOD THEREOF

(71) Applicant: ASUS GLOBAL PTE. LTD., Singapore (SG)

(72) Inventors: Xian-Cai Gong, Singapore (SG); Yong-Kang Shan, Singapore (SG); Hong-Liang Bian, Singapore (SG)

(73) Assignee: ASUS GLOBAL PTE. LTD., Singapore (SG)

( * ) Notice: Subject to any disclaimer, the term of this patent is extended or adjusted under 35 U.S.C. 154(b) by 410 days.

(21) Appl. No.: 17/118,760

(22) Filed: Dec. 11, 2020

(65) Prior Publication Data
US 2021/0188214 A1    Jun. 24, 2021

(30) Foreign Application Priority Data
Dec. 20, 2019    (CN) .......................... 201911326821.3

(51) Int. Cl.
| | |
|---|---|
| B60R 25/10 | (2013.01) |
| H02J 7/00 | (2006.01) |
| G07C 9/00 | (2020.01) |
| G07C 9/20 | (2020.01) |
| B60R 16/03 | (2006.01) |
| H02J 50/00 | (2016.01) |

(52) U.S. Cl.
CPC .......... *B60R 25/1001* (2013.01); *B60R 16/03* (2013.01); *G07C 9/00182* (2013.01); *G07C 9/20* (2020.01); *H02J 7/0047* (2013.01); *H02J 50/00* (2016.02)

(58) Field of Classification Search
None
See application file for complete search history.

(56) References Cited

U.S. PATENT DOCUMENTS

| | | | | |
|---|---|---|---|---|
| 2019/0118765 | A1* | 4/2019 | House | G04B 47/00 |
| 2019/0202401 | A1* | 7/2019 | Lee | B60R 25/01 |
| 2019/0393706 | A1* | 12/2019 | Huggins | H02J 13/00002 |
| 2020/0219500 | A1* | 7/2020 | Bender | G10L 15/22 |
| 2020/0380968 | A1* | 12/2020 | Hatfield | G06F 16/90 |
| 2021/0033729 | A1* | 2/2021 | Alalusi | G01S 17/93 |
| 2021/0188214 | A1* | 6/2021 | Gong | H02J 7/0047 |

(Continued)

FOREIGN PATENT DOCUMENTS

| | | |
|---|---|---|
| CN | 204334041 U | 5/2015 |
| CN | 206983843 U | 2/2018 |

(Continued)

*Primary Examiner* — Fekadeselassie Girma
(74) *Attorney, Agent, or Firm* — McClure, Qualey & Rodack, LLP

(57) ABSTRACT

A wireless charging device and a warning signal generating method are provided in this disclosure. The warning signal generating method includes: determining whether the smart key of the vehicle is in an operating mode according to a wireless unlock signal when a vehicle is turned off; determining whether a door of the vehicle is opened when the smart key is not in the operating mode; determining whether a portable electronic device is on a wireless charging base of the wireless charging device when the door is opened; and generating a warning signal when the portable electronic device is on the wireless charging base.

8 Claims, 5 Drawing Sheets

(56) References Cited

U.S. PATENT DOCUMENTS

2022/0344964 A1* 10/2022 Duarte .................... H02S 10/40
2023/0073436 A1* 3/2023 Kent ...................... B60Q 1/247

FOREIGN PATENT DOCUMENTS

| KR | 101597470 B1 | * | 2/2016 |
| KR | 20160034671 A | * | 3/2016 |
| KR | 101640682 B1 | * | 7/2016 |

* cited by examiner

WIRELESS CHARGING DEVICE AND WARNING SIGNAL GENERATING METHOD THEREOF

CROSS-REFERENCE TO RELATED APPLICATION

This application claims the priority benefit of Chinese applications serial No. 201911326821.3, filed on Dec. 20, 2019. The entirety of the above-mentioned patent application is hereby incorporated by reference herein and made a part of specification.

BACKGROUND OF THE INVENTION

Field of the Invention

The invention relates to a wireless charging device and, more particularly, to a wireless charging device of a vehicle and a warning signal generating method thereof.

Description of the Related Art

With the development of Internet of Vehicles (IoV), wireless charging technology has also been applied to the vehicle. The driver or passengers can charge an electronic device through the wireless charging device on board, which further extends the endurance of the electronic device. However, the drivers or passengers sometimes forget to bring alone the electronic device that was put on the wireless charging device when leaving the vehicle. The driver or passengers have to return to the vehicle to get the electronic device, which is quite inconvenient. Furthermore, when someone who have interests to the electronic device that has been left inside the vehicle, he/she may break into the vehicle and steal the electronic device, which causing serious property damage.

BRIEF SUMMARY OF THE INVENTION

According to the first aspect, a wireless charging device adapted for a vehicle with a controller and a smart key configured to communicate with the vehicle is provided. The wireless charging device includes a wireless charging base and a control circuit. The wireless charging base is located in the vehicle to generate a wireless power. The control circuit is coupled to the wireless charging base. The control circuit determines whether the smart key is in an operating mode according to a wireless unlock signal from the controller when the vehicle is turned off, determines whether a portable electronic device is on the wireless charging base when the smart key is not in the operating mode while a door of the vehicle is opened, and generates a warning signal when a portable electronic device is determined on the wireless charging base.

According to the second aspect, a warning signal generating method adapted for a wireless charging device for vehicles is provided. The warning signal generating method includes the steps of: determining whether the smart key of the vehicle is in an operating mode according to a wireless unlock signal when a vehicle is turned off; determining whether a door of the vehicle is opened when the smart key is not in the operating mode; determining whether a portable electronic device is on a wireless charging base of the wireless charging device when the door is opened; and generating a warning signal when the portable electronic device is on the wireless charging base.

These and other features, aspects and advantages of the present invention will become better understood with regard to the following description, appended claims, and accompanying drawings.

DETAILED DESCRIPTION OF THE EMBODIMENTS

Figure 1:
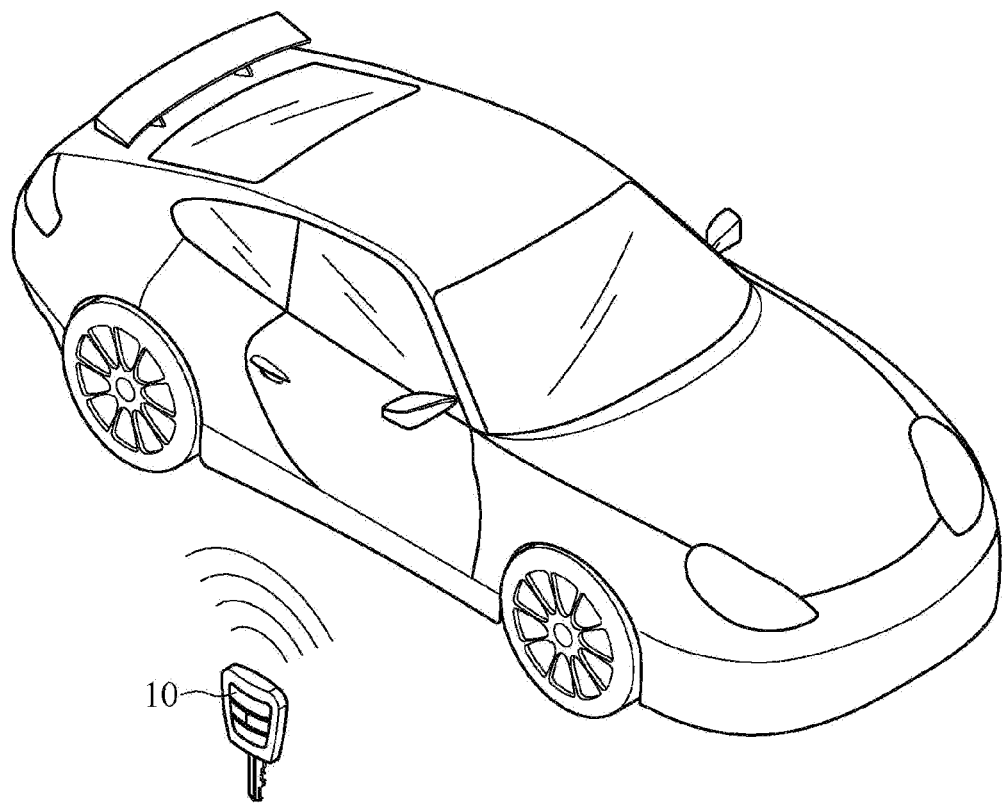
FIG. 1 is a schematic diagram of a smart key suitable for the vehicle according to an embodiment.
Figure 2:
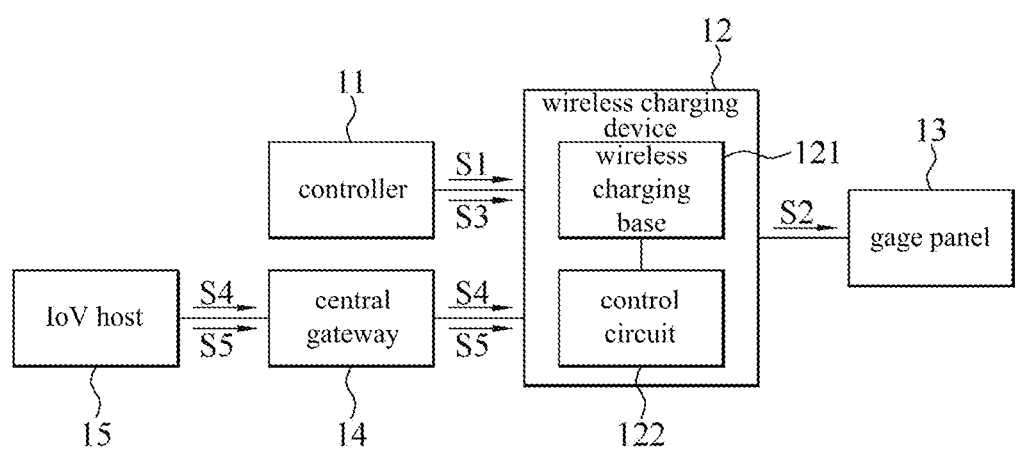
FIG. 2 is a block diagram of a vehicle wireless charging system suitable for the vehicle of FIG. 1 according to an embodiment.

Please refer to FIG. 1, which is a schematic diagram of a smart key suitable for the vehicle according to an embodiment. FIG. 2 is a block diagram of a vehicle wireless charging system suitable for the vehicle of FIG. 1 according to an embodiment. Please refer to FIG. 1 and FIG. 2 together. The car wireless charging system includes a controller 11 and a wireless charging device 12. The controller 11 is coupled to the wireless charging device 12.

In an embodiment, the controller 11 integrates a Passive Entry/Passive Start (PEPS) system. The controller 11 communicates with the smart key 10 through radio frequency (RF) technology. The driver of the vehicle controls the controller 11 to lock and unlock the vehicle through the smart key 10, and the driver starts the vehicle through the smart key 10 and then drives the vehicle.

Figure 3:
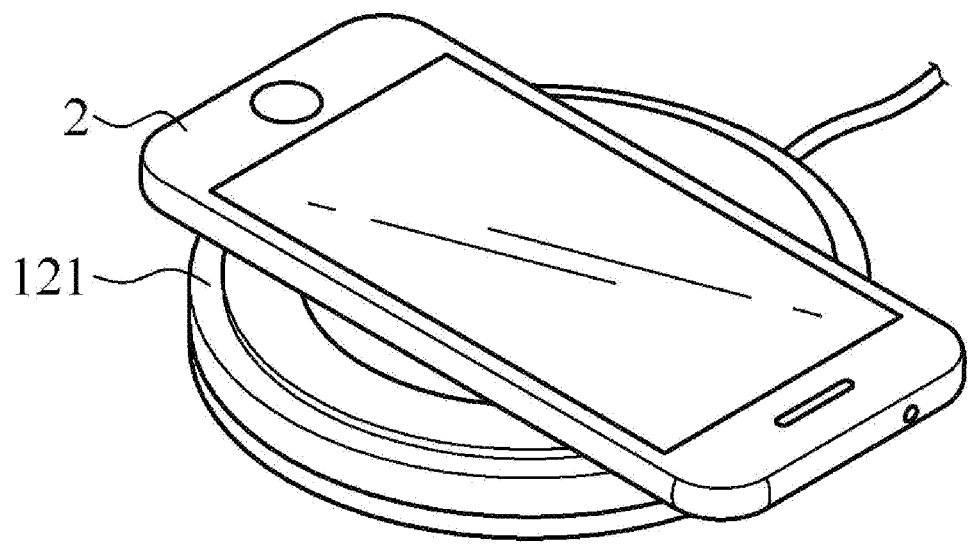
FIG. 3 is a schematic diagram of a wireless charging base of FIG. 2 according to an embodiment.
Figure 4:
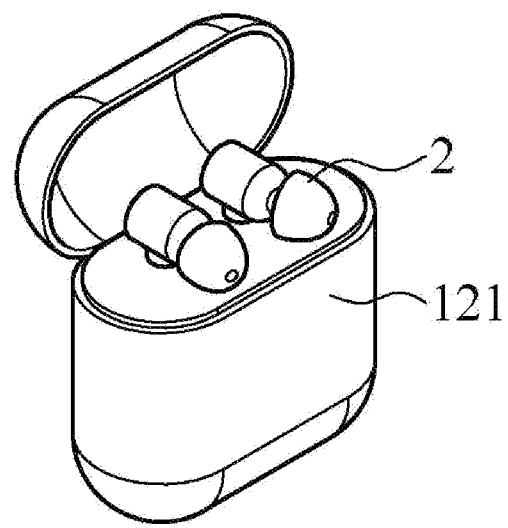
FIG. 4 is a schematic diagram of the wireless charging base of FIG. 2 according to another embodiment.

The wireless charging device 12 includes a wireless charging base 121 and a control circuit 122, and the wireless charging base 121 is coupled to the control circuit 122. The wireless charging base 121 is disposed in the vehicle, the wireless charging base 121 includes a coil, and the wireless charging base 121 transmits the wireless power through its coil. Please refer to FIG. 3 and FIG. 4 together. When the portable electronic device 2 is on the wireless charging base 121, the wireless charging base 121 transmits the wireless power to the portable electronic device 2. Furthermore, the wireless charging device 12 has a warning function. When the driver or passenger places the portable electronic device 2 on the wireless charging device 12 and is going to leave the vehicle, the wireless charging device 12 generates a warning to remind the driver or passenger that the portable electronic device 2 is left on the wireless charging base 121. In an embodiment, as shown in FIG. 3 and FIG. 4, the portable electronic device 2 is a smart phone, a tablet computer, or a wireless headset, which is not limited herein. In one embodiment, as shown in FIG. 3 and FIG. 4, the wireless charging base 121 is a smart phone wireless charger or a wireless earphone charging case, which is not limited herein.

Figure 5:
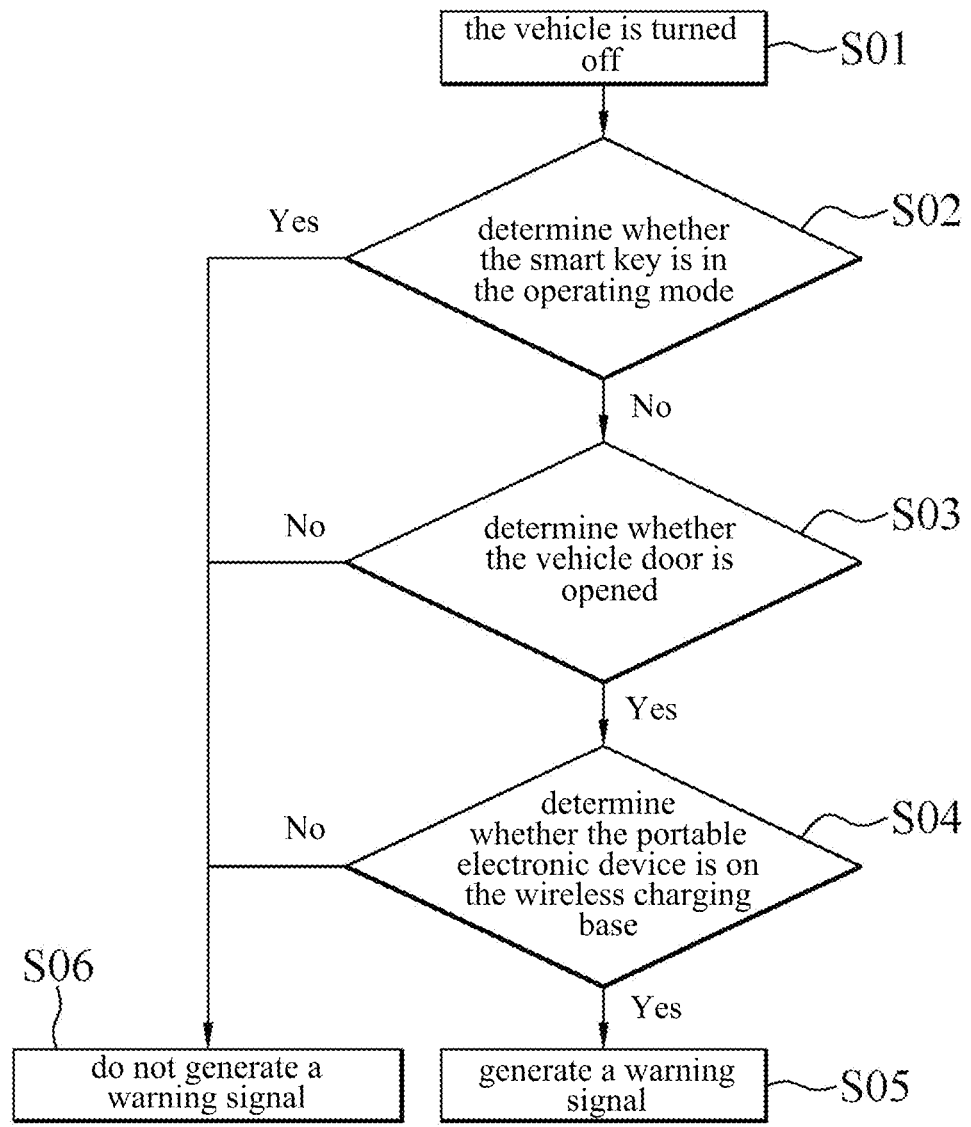
FIG. 5 is a flowchart of a warning signal generating method suitable for a wireless charging device according to an embodiment.

Please refer to FIG. 5 together. In detail, when the vehicle is turned off (step S01), the control circuit 122 determines whether the smart key 10 is in the operating mode (step S02) according to a wireless unlock signal S1 from the controller 11. When the smart key 10 is not in the operating mode (for example, the smart key 10 is in the sleep mode), it means that there is no radio frequency signal transmission between the smart key 10 and the controller 11, and therefore the wireless charging device 12 does not interfere by radio frequency signals. Meanwhile, the control circuit 122 determines whether the vehicle door is opened (step S03). When it is determined that the vehicle door of the vehicle is opened, the control circuit 122 determines whether the portable electronic device 2 is on the wireless charging base 121 (step S04). When the control circuit 122 determines that the portable electronic device 2 is on the wireless charging base 121 (it means that the determination result is "Yes"), the control circuit 122 generates a warning signal S2.

Based on the above, when the driver or passenger is going to leave the vehicle, the wireless charging device 12 generates the warning signal S2 to remind the driver or passengers that the portable electronic device 2 is left in the vehicle. Therefore, the driver or passenger will not forget to bring alone the portable electronic device 2, and the vehicle will not be break into by a person who intent to steal the portable electronic device 2 that has been left in the vehicle. Moreover, the wireless charging device 12 avoids the operating frequency of the smart key 10 and the controller 11. That is, the wireless charging device 12 is not interfered by the radio frequency signals generated by the smart key 10 and the controller 11 to misjudge whether the portable electronic device 2 is on the wireless charging base 121. Therefore, the wireless charging device 12 generates the warning signal S2 accurately.

In one embodiment, the controller 11 detects whether the vehicle is turned off. In step S01, the control circuit 122 determines that the vehicle is turned off according to the detection result generated by the controller 11. When the vehicle is turned off, the wireless charging device 12 stops charging the portable electronic device 2. Furthermore, in step S04, the control circuit 122 determines whether the portable electronic device 2 is on the wireless charging base 121 according to the standard in wireless charging technology, such as Qi protocol.

In one embodiment, when the smart key 10 is in the operating mode, the controller 11 generates the wireless unlock signal S1 with a high potential. When the smart key 10 is not in the operating mode (For example, the smart key 10 is in the sleep mode) the controller 11 generates the wireless unlock signal S1 with a low potential. Based on this, in step S02, the control circuit 122 determines whether the wireless unlock signal S1 has a high potential to determine whether the smart key 10 is in the operating mode.

As shown in FIG. 2, in one embodiment, the controller 11 detects whether any door of the vehicle is opened. When the door (such as a driver door) is opened, the controller 11 generates and sends a door open signal S3. Based on this, as shown in FIG. 5, when the control circuit 122 determines that the smart key 10 is not in the operating mode (it means that the determination result is "No") in step S02, the control circuit 122 further determines whether the door is opened (step S03). In step S03, when the controller 11 generates the door open signal S3, the wireless charging device 12 receives the door open signal S3 from the body controller 11, and the control circuit 122 of the wireless charging device 12 determines that the door is opened according to the door open signal S3 (it means that the determination result is "Yes" in step S03). And then executes step S04, to determine whether the portable electronic device is on the wireless charging base 121 when the driver is going to leave the car.

In an embodiment, when the smart key 10 is in the operating mode, it means that the smart key 10 can transmit and receive radio frequency signals and communicate with the controller 11. The operating frequency of the smart key 10 is similar to the operating frequency of the wireless charging device 12. In order to prevent the control circuit of the wireless charging device 12 from being interfered by the radio frequency signal generated by the smart key 10 or the controller 11, when the control circuit 122 determines that the smart key 10 is in the operating mode according to the wireless unlock signal S1 (it means that the determination result is "Yes") in step S02, the control circuit 122 does not perform the determination steps S03 and S04 and does not generate the warning signal S2 (step S06). Furthermore, when the control circuit 122 determines that the door is not opened (it means that the determination result is "No") in step S03 (it means that the driver does not intend to leave the vehicle), the control circuit 122 does not perform the determination step S04 and does not generate the warning signal S2 (step S06). Moreover, in step S04, when the control circuit 122 determines no portable electronic device on the wireless charging base 121 (it means that the determination result is "No"), the control circuit 122 also does not generate the warning signal S2 (step S06).

In one embodiment, the vehicle further includes a gage panel 13, the warning signal S2 is presented as text or image. As shown in FIG. 2, the wireless charging device 12 is coupled to the gage panel 13, and the wireless charging device 12 sends the warning signal S2 to the gage panel 13, and the gage panel 13 displays the image or the text corresponding to the warning signal S2 to remind the driver or passengers of the vehicle that the portable electronic device 2 has been left on the wireless charging base 121. In an embodiment, the warning signal S2 is a horn sound of the vehicle.

In an embodiment, as shown in FIG. 2, the vehicle wireless charging system further includes a central gateway 14 and an IoV (Internet of Vehicles) host 15, the central gateway 14 is coupled between the IoV host 15 and the wireless charging device 12. The IoV host 15 has a wireless charging control function that controls the wireless charging device 12 to work. The IoV host 15 generates a status signal S4 indicating that the wireless charging control function is enabled or disabled. Moreover, the IoV host 15 controls the warning function to be enabled or disabled, and the IoV host 15 generates the status signal S4 indicating that the warning function is enabled or disabled. The driver of the vehicle sets the wireless charging control function to be on or off according to his needs, and the IoV host 15 generates the corresponding status signal S4 and then sends the status signal S4 to the wireless charging device 12 via the central gateway 14. In addition, the driver of the vehicle is also free to enable or disable the warning function according to his needs, to set the IoV host 15 generates a corresponding status signal S5, and then the status signal S5 is sent to the wireless charging device 12 through the central gateway 14.

Figure 6:
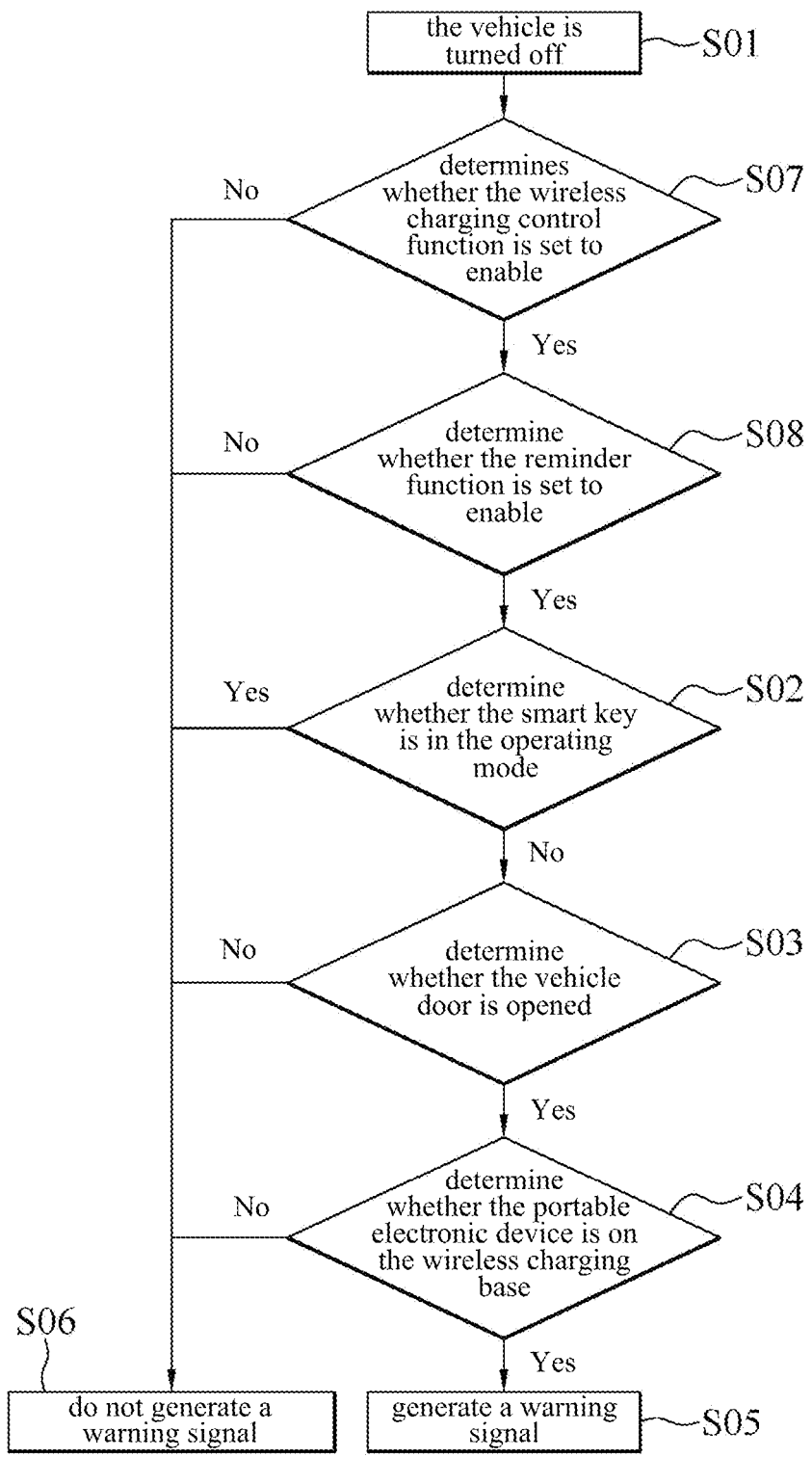
FIG. 6 is a flowchart of a warning signal generating method suitable for a wireless charging device according to another embodiment.

Please refer to FIG. 6. When the vehicle is turned off, the control circuit 122 determines whether the wireless charging control function is set to enable according to the status signal S4 (step S07) before the control circuit 122 determines whether the smart key 10 is in the operating mode (step S02). When the wireless charging control function is set to enable (it means that the determination result is "Yes"), it means that the portable electronic device 2 is possible on the wireless charging base 121. The control circuit 122 further determines whether the warning function is set to enable according to the status signal S5 (step S08). When the warning function is set to enable (it means that the determination result is "Yes"), the control circuit 122 starts to determine whether the smart key 10 is in an operating mode (step S02).

On the other hand, when the wireless charging control function is set to disable, it means that the wireless charging base 121 cannot supply power to the portable electronic device 2 or the portable electronic device 2 is not on the wireless charging base 121. When the control circuit 122 determines that the wireless charging control function is set to be off according to the status signal S4 (it means that the determination result is "No") in step S07, the control circuit 122 does not execute the step S08 and steps S02 to S04 and does not generate the warning signal S2 (step S06). When the warning function is set to be off, it means that the driver and passengers do not need the warning function. When the control circuit 122 determines that the warning function is set to be off according to the status signal S5 in step S08 (it means that the determination result is "No"), the control circuit 122 does not execute the subsequent steps S02 to S04 and does not generate the warning signal S2 (step S06).

In an embodiment, the duty cycle time of the smart key 10 is 30 seconds. After the vehicle is turned off, when the determination result in step S07 is "No", the determination result in step S08 is "No", the determination result in step S02 is "Yes", the determination result in step S03 is "No" or the determination result in step S04 is "No", the control circuit 122 does not generate the warning signal S2. The control circuit 122 repeatedly executes step S07, step S08, step S02, step S03 and step S04 in sequence within a preset time (such as 1 minute), and the preset time is greater than the duty cycle time. After the preset time, the control circuit 122 stops performing any determination step. In an embodiment, after the vehicle is turned off and the smart key 10 is in the operating mode, the control circuit 122 generates a "Yes" determination result in step S02 and does not generate the warning signal S2 (step S06). Then, within 1 minute—the preset time that mentioned above, the control circuit 122 repeatedly executes step S08, step S02, step S03 and step S04 in sequence. When the smart key 10 has been switched to the sleep mode for 30 seconds, the control circuit 122 executes the subsequent steps S03 and S04 when the determination result of "No" is generated in the step S02, to determine whether the portable electronic device 2 is on the wireless charging base 121 when the smart key 10 is not in the operating mode.

In an embodiment, the controller 11 has a general purpose input output (GPIO) pin connected to the wireless charging device 12. When the smart key 10 is in the operating mode, the controller 11 generates the wireless unlock signal S1 and transmits the wireless unlock signal S1 to the wireless charging device 12 through GPIO pin.

Figure 7:
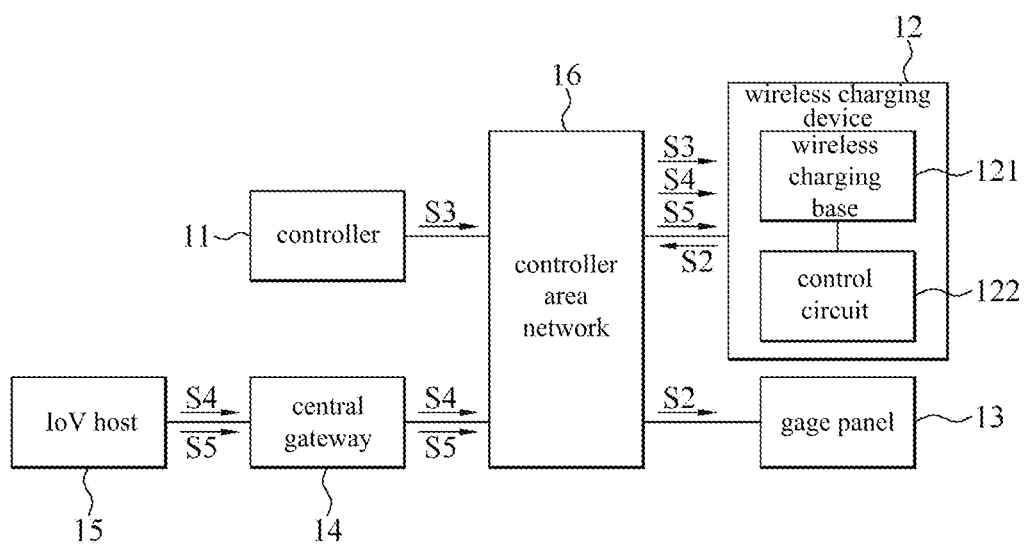
FIG. 7 is a block diagram of a vehicle wireless charging system suitable for a vehicle of FIG. 1 according to another embodiment.

Please refer to FIG. 7. In one embodiment, the wireless charging system for vehicles further includes a controller local area network (CAN) 16. The controller 11, the wireless charging device 12, the gage panel 13 and the central gateway 14 are coupled to the controller local area network 16. The controller 11 and the central gateway 14 communicate with the wireless charging device 12 through the controller local area network 16, and the wireless charging device 12 communicates with the gage panel 13 through the controller local area network 16. In an embodiment, when the door is opened, the controller 11 generates and transmits the door open signal S3 to the controller local area network 16, and the controller local area network 16 transmits the door open signal S3 to the wireless charging device 12. Next, when the control circuit 122 determines that the portable electronic device 2 is on the wireless charging base 121, the wireless charging device 12 generates and transmits the warning signal S2 to the controller local area network 16, and then the controller local area network 16 transmits the warning signal S2 to the gage panel 13. Then, the IoV host 15 generates the status signal S4 and the status signal S5 according to the wireless charging control function setting and the warning function setting, and transmits the status signal S4, S5 to the central gateway 14. The central gateway 14 transmits the status signals S4, S5 to the controller local area network 16, and the controller local area network 16 transmits the status signal S4, S5 to the wireless charging device 12.

In summary, according to the disclosure, the wireless charging device reminds the driver and passengers who intend to leave the vehicle that the portable electronic device is left inside the vehicle through the warning signal. Therefore, the driver or passengers can retrieve the portable electronic device in time, and avoid car break in by thieves to steal the portable electronic device inside the vehicle. Furthermore, the wireless charging device will not be interfered by the radio frequency signals generated by the smart key and the controller, and misjudges whether the portable electronic device is left in the wireless charging base, thereby accurately generating the warning signal.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A wireless charging device, comprising:
   a wireless charging base, located in a vehicle with a controller to generate a wireless power; and
   a control circuit, coupled to the wireless charging base, the control circuit determines whether a smart key configured to communicate with the vehicle is in a sleep mode according to a wireless unlock signal from the controller when the vehicle is turned off, determines whether a portable electronic device is on the wireless charging base when the smart key is in the sleep mode and a door of the vehicle is opened, and generates a warning signal when a portable electronic device is determined on the wireless charging base;
   wherein, when the smart key is in the sleep mode, there is no radio frequency signal transmission between the smart key and the controller.

2. The wireless charging device according to claim 1, when the smart key is in an operating mode rather than the sleep mode, the control circuit repeatedly determines whether the smart key is in the sleep mode within a preset time, when it is determined that the smart key is in the sleep mode after repeatedly determining whether the smart key is in the sleep mode, the control circuit determines whether a portable electronic device is on the wireless charging base when the door is opened, to decide whether to generate the warning signal, wherein the preset time is greater than a duty cycle time of the smart key in the operating mode.

3. The wireless charging device according to claim 1, when the vehicle is turned off, the control circuit determines whether a wireless charging control function for generating the wireless power is set to enable, when the wireless charging control function is enabled, the control circuit determines whether a warning function for generating the warning signal is set to enable, when the warning function is enabled, the control circuit determines whether the smart key is in the sleep mode.

4. The wireless charging device according to claim 1, the control circuit further sends the warning signal through a controller local area network of the vehicle to display the warning signal on the vehicle's a gage panel.

5. A warning signal generating method, comprising:
   determining whether thea smart key of a vehicle is in a sleep mode according to a wireless unlock signal when the vehicle is turned off;
   determining whether a door of the vehicle is opened when the smart key is in the sleep mode;
   determining whether a portable electronic device is on a wireless charging base of a wireless charging device when the door is opened; and
   generating a warning signal when the portable electronic device is on the wireless charging base;
   wherein, when the smart key is in the sleep mode, there is no radio frequency signal transmission between the smart key and the controller.

6. The warning signal generating method according to claim 5, further comprising:
   repeatedly determining whether the smart key is in the sleep mode within a preset time when the smart key is in an operating mode rather than the sleep mode; and
   determining whether the door is opened when it is determined that the smart key is not in the sleep mode after repeatedly determining whether the smart key is in the sleep mode, to determine whether a portable electronic device is on the wireless charging base when the door is opened;
   wherein the preset time is greater than a duty cycle time of the smart key in the operating mode.

7. The warning signal generating method according to claim 5, before determining whether the smart key is in the sleep mode, the warning signal generating method further comprising:
   determining whether a wireless charging control function of the vehicle is set to enable;
   determining whether a warning function for generating the warning signal is set to enable when the wireless charging control function is enabled; and
   determining whether the smart key is still in the sleep mode when the warning function is set to enable.

8. The warning signal generating method according to claim 5, further comprising:
   displaying the warning signal on a gage panel of the vehicle.

* * * * *